United States Patent [19]
Perlman et al.

[11] Patent Number: 5,931,949
[45] Date of Patent: Aug. 3, 1999

[54] EXPANSION PORT PROVIDING SYSTEM POWER-DOWN PRIOR TO CONNECTION OF PERIPHERAL DEVICES

[75] Inventors: Stephen G. Perlman, Mountain View; Tim Bucher, Los Altos, both of Calif.

[73] Assignee: WEBTV Networks, Inc., Mountain View, Calif.

[21] Appl. No.: 08/859,833

[22] Filed: May 16, 1997

[51] Int. Cl.$^6$ .................................................. G06F 1/00
[52] U.S. Cl. ........................................ 713/300; 710/101
[58] Field of Search .................................. 439/911, 928; 200/61.62, 50.01, 50.02, 50.1, 50.12; 361/686, 683; 348/730; 364/708.1; 713/300, 310, 324, 330, 340; 710/101, 102, 100

[56] References Cited

U.S. PATENT DOCUMENTS

| | | | |
|---|---|---|---|
| 4,835,737 | 5/1989 | Herrig et al. | 364/900 |
| 4,872,139 | 10/1989 | Okamoto et al. | 365/52 |
| 5,386,567 | 1/1995 | Lien et al. | 395/700 |
| 5,404,542 | 4/1995 | Cheung | 395/750.01 |
| 5,558,339 | 9/1996 | Perlman | 463/42 |
| 5,586,257 | 12/1996 | Perlman | 463/42 |
| 5,628,637 | 5/1997 | Pecone et al. | 439/74 |
| 5,726,922 | 3/1998 | Womble et al. | 364/708.1 |
| 5,758,101 | 5/1998 | Pemberton | 395/283 |

*Primary Examiner*—Ayaz R. Sheikh
*Assistant Examiner*—Xuong M. Chung-Trans
*Attorney, Agent, or Firm*—Workman, Nydegger, Seeley

[57] ABSTRACT

An expansion port for a processing system peripheral device provides for a system power down prior to connection of another device to the port. A number of devices in a processing system are connected in a daisy chain. One of the devices includes a power supply for supplying power to each of the devices. Each of the devices includes a segment of an enable circuit for enabling or disabling the power supply. Each of the devices further includes an expansion port for connecting the enable circuit and other signals to another device in the daisy chain. An access panel is provided to cover the expansion port when the port is not in use. When the access panel is closed a switch located at the expansion port and coupled to the enable circuit of the device is actuated in order to enable the power supply. When the access panel is not in place and no other device is connected to the expansion port, the switch is in a different position which causes the power supply to be disabled. If another device is properly connected to the expansion port, then the switch is in the first position to cause the power supply to be enabled, provided all other devices in the daisy chain are also properly connected. Accordingly, removal of an access panel on one of the devices while power to the system is on causes power to the system to be removed before another device can be connected to the expansion port, thus preventing damaging electrical transients from occurring upon connection to the expansion port.

29 Claims, 5 Drawing Sheets

EXPANSION PORT PROVIDING SYSTEM POWER-DOWN PRIOR TO CONNECTION OF PERIPHERAL DEVICES

FIELD OF THE INVENTION

The present invention pertains to the field of computer systems. More particularly, the present invention relates to an expansion port for connecting a peripheral device in a computer system.

BACKGROUND OF THE INVENTION

Many computer systems provide what is known as "hot insertion" capability, which allows peripheral devices to be connected to the system while power to the system is on. One design concern associated with hot insertion capability is the potential for certain circuitry resident on a peripheral bus to be damaged by electrical transients when connecting a peripheral device with power on. In the past, this problem has been addressed by the addition of buffer circuitry "between" (electrically) the memory devices and the point at which peripheral devices are connected to the system. One problem with this technique, however, is that the buffer circuitry adds to the cost of the system. Therefore, it is desirable to provide a means by which peripheral devices can be connected to a processing system with the convenience to the user that is often associated with hot insertion capability, but without the need for buffer circuitry to protect against damage due to electrical transients.

SUMMARY OF THE INVENTION

The present invention pertains to a first device for use in a processing system which has a number of devices, one of which includes a power supply. The first device includes enable circuitry for enabling or disabling the power supply. A port coupled to the enabled circuitry provides a connection point for the first device to be connected to another device in the processing system. An access panel is mounted to prevent or permit access to the port. The power supply is enabled if the access panel is configured to prevent access to the port. The power supply is disabled if the access panel is configured to permit access to the port and no other device is connected to the port.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An expansion port is described which provides for system power-down prior to connection of a peripheral device to the port. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention includes a method and apparatus for conveniently connecting a peripheral device to a processing system while protecting against damage due to electrical transients. In one embodiment, the present invention is included in a system known as WebTV™ (hereinafter "WebTV"), which uses a standard television set as a display device for browsing the Web and which connects to the Internet using a standard telephone, ISDN, or other similar communication path. A user of a WebTV client system can utilize WebTV Network services provided by one or more remote WebTV servers, which are generally accessed via the Internet. The WebTV Network services are used in conjunction with software running in a WebTV client system to enable the user to browse the Web, send electronic mail, and to make use of the Internet in various other ways.

Figure 1:
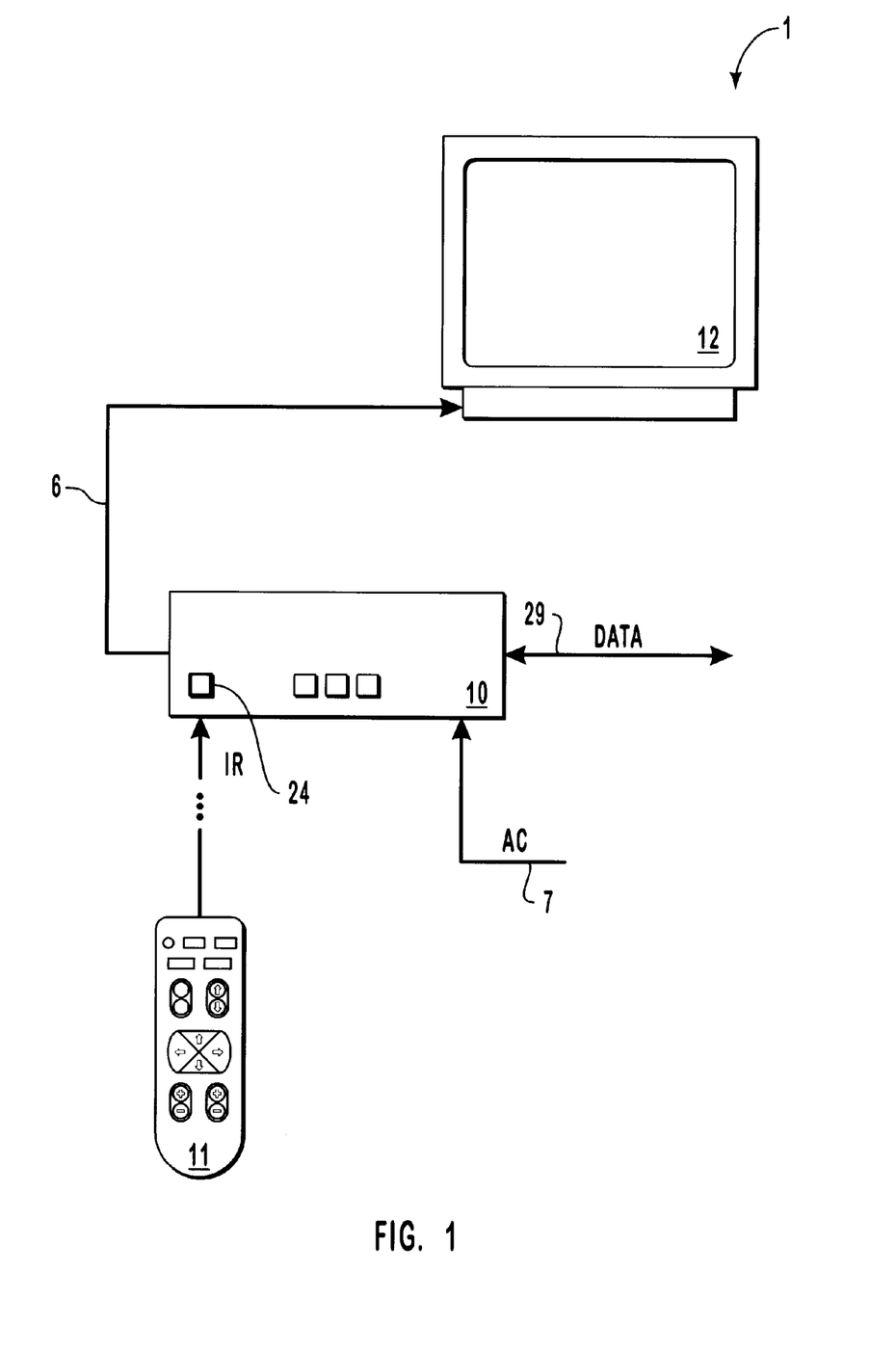
FIG. 1 illustrates a WebTV client system.

FIG. 1 illustrates a WebTV client system 1 according to one embodiment. The client system 1 includes an electronics unit 10 (hereinafter "the WebTV box 10" or "the box 10"), an ordinary television set 12, and a hand-held remote control 11. In an alternative embodiment (not shown), the WebTV box 10 is built into the television set 12 as an integral unit. The box 10 includes hardware and software for providing the user with a graphical user interface by which the user can browse the Web, send e-mail, and access other WebTV Network services. The client system 1 uses the television set 12 as both a display device and an audio output device. The box 10 is coupled to the television set 12 by a link 6. The link 6 includes an audio channel for generating sound from the television's speaker and an RF (radio frequency), S-video, composite video, or other equivalent form of video channel. The data link 29 between the box 10 and the server 5 can be a conventional telephone (POTS, i.e., Plain Old Telephone Service), ISDN, or other suitable data connection. The box 10 receives alternating-current (AC) power through a conventional AC power line 7. Remote control 11 is operated by the user in order to control the client system 1 to browse the Web and perform other functions. The box 10 receives commands from remote control 11 via an infrared (IR) communication link. In alternative embodiments, the link between the remote control 11 and the box 10 may be an RF link or any other suitable type of link.

Figure 2:
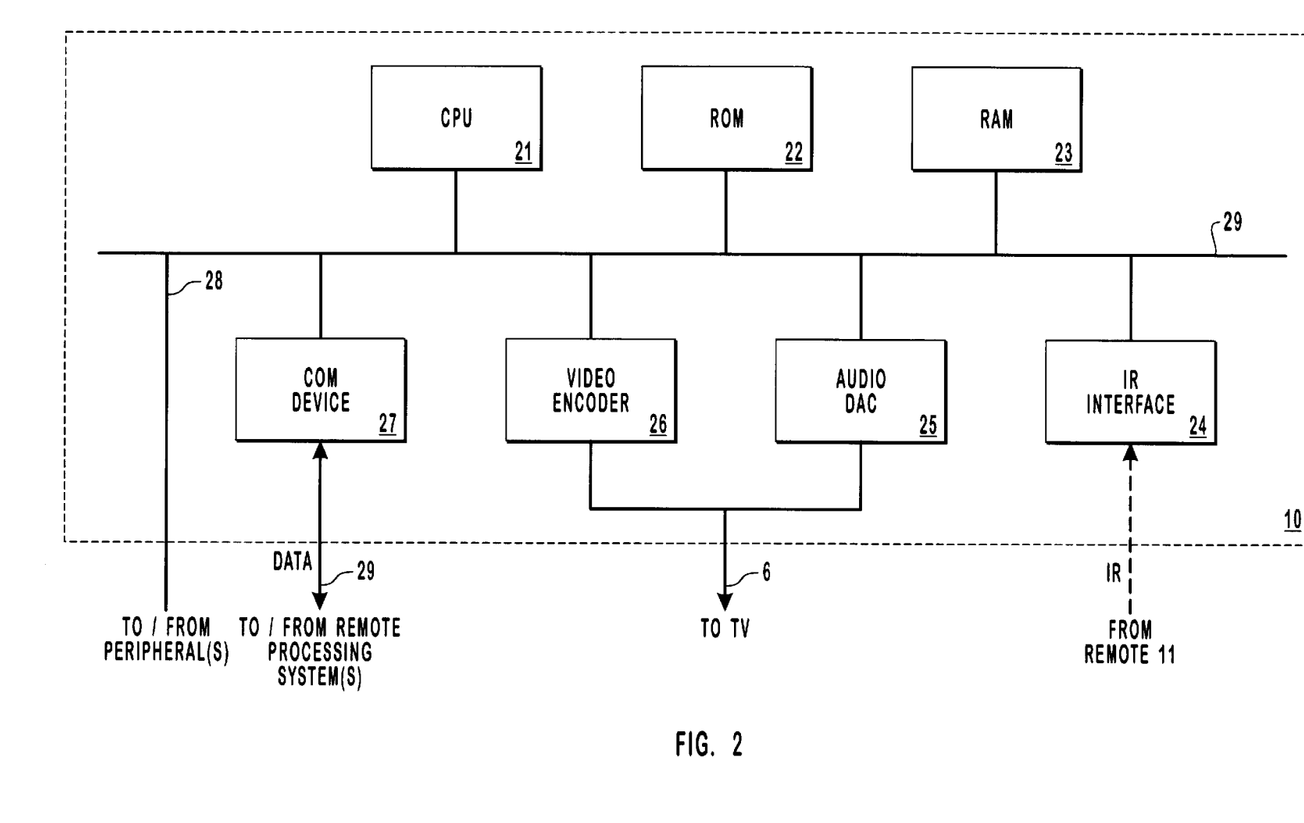
FIG. 2 illustrates, in block diagram form, the internal features of a WebTV box.

FIG. 2 shows the internal components of the WebTV box 10, according to one embodiment. Operation of the client system 1 is controlled by a central processing unit (CPU) 21, which is coupled to a bus 29. It will be understood that the bus 29 may actually comprise multiple physical buses connected by various bridges and/or adapters, the details of which are not required for an understanding of the present invention. Also coupled to the bus 29 are an audio digital-to-analog converter (DAC) 25, which provides audio output to the television 12, and a video encoder 26, which provides video output to the television set 12. The outputs of the audio DAC 25 and the video encoder 26 are combined by conventional circuitry (not shown) to produce the link 6 to the television 12. An IR interface 24 coupled to the bus 29 detects IR signals transmitted by remote control 11 and, in response, provides corresponding electrical signals onto the bus 29. A communication device 27 is coupled to the bus 29 to provide bi-directional data communication with remote WebTV servers and Web servers. The communication device 27 may be a conventional telephone modem, an ISDN adapter, or any other suitable data communication device. Also coupled to the bus 29 is a read-only memory (ROM) 22 and a random access memory (RAM) 23. The ROM 22 may include programmable-erasable memory, such as electrically-erasable programmable ROM (EEPROM) or flash memory.

Also coupled to the bus 29 is an expansion bus 28. The expansion bus 28 is a high-speed, multiplexed (address and data), parallel bus that is used to connect various peripheral devices to the WebTV box 10; the WebTV box 10 thereby functions as the host device of the processing system. Peripheral devices which may be connected to the WebTV box 10 using expansion bus 28 include devices such as mass storage devices (e.g., CD-ROM, digital versatile disk (DVD), magnetic disk, etc.), microphones, video cameras, video tuners, and additional data communication devices. It will be recognized that various adapters may be used to interface the expansion bus 28 with bus 29, the details of which are not required for an understanding of the present invention.

It will be recognized that if a peripheral device were to be connected to the expansion bus 28 while system power is on, there would be the potential for damage to, or disruption of, certain components of the WebTV box 10, particularly any components which reside on the expansion bus 28, as a result of electrical transients. Consequently, the present invention prevents such damage or disruption from occurring when connecting a peripheral device to the WebTV box, without requiring the user to remove power from the system, as will be described below.

Figure 3:
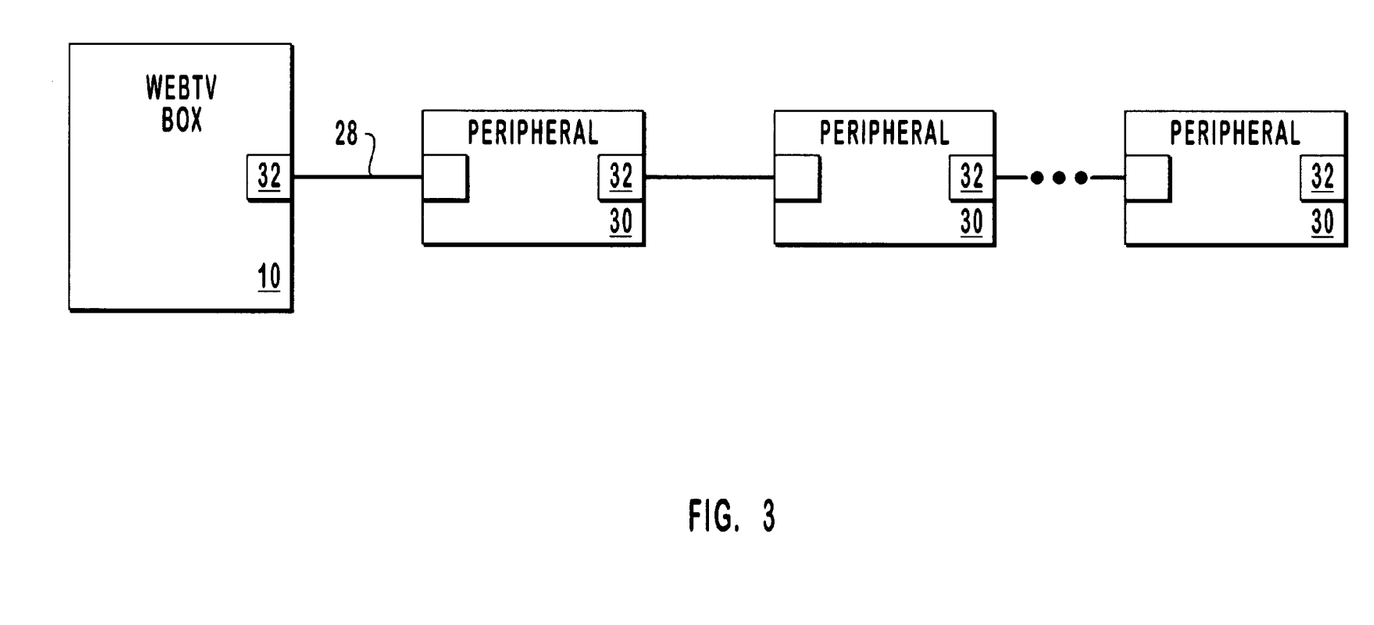
FIG. 3 illustrates a WebTV box connected to a number of peripheral devices in a daisy chain configuration.

FIG. 3 illustrates a system according to the present invention, in which the WebTV box 10 is connected in a daisy chain to a number of peripheral devices 30 by the expansion bus 28. It is useful at this point to define terminology relating to the topological position (i.e, slot position) of devices in the daisy chain. For purposes of this description, the qualifier "more senior in the daisy chain" refers to devices that are topologically closer to the WebTV box 10 in the daisy chain than a given device, while the qualifier "more junior in the daisy chain" refers to devices that are topologically farther from the WebTV box 10 in the daisy chain than a given device. Thus, the greater the number of devices that are connected in the daisy chain between a given device and the WebTV box 10, the "more junior" in the daisy chain the given device is considered to be; the fewer the number of devices that are connected in the daisy chain between a given device and the WebTV box 10, the "more senior" in the daisy chain the given device is considered to be.

The present invention includes features designed to prevent damage due to electrical transients from occurring when adding a peripheral device to the daisy chain. In particular, the WebTV box 10 and each peripheral device 30 includes an expansion port 32 and certain associated circuitry, which are described in greater detail below. The expansion port and associated circuitry, which are substantially identical in each peripheral device and the WebTV box 10, are designed so that power to the system will be automatically removed before any peripheral device can be connected to a device that is already connected to the daisy chain. Because the devices are configured in a daisy chain, each peripheral device 30 includes at least two separate expansion ports, i.e., one port for connecting to a device more senior in the daisy chain (or to the WebTV box itself) and another port for connecting to a device more junior in the daisy chain (if any). The expansion port 32 of a given peripheral device 30 is the port intended for connecting to a device more junior in the daisy chain. The expansion port 32 provides all signals of the high-speed expansion bus 28.

Figure 4:
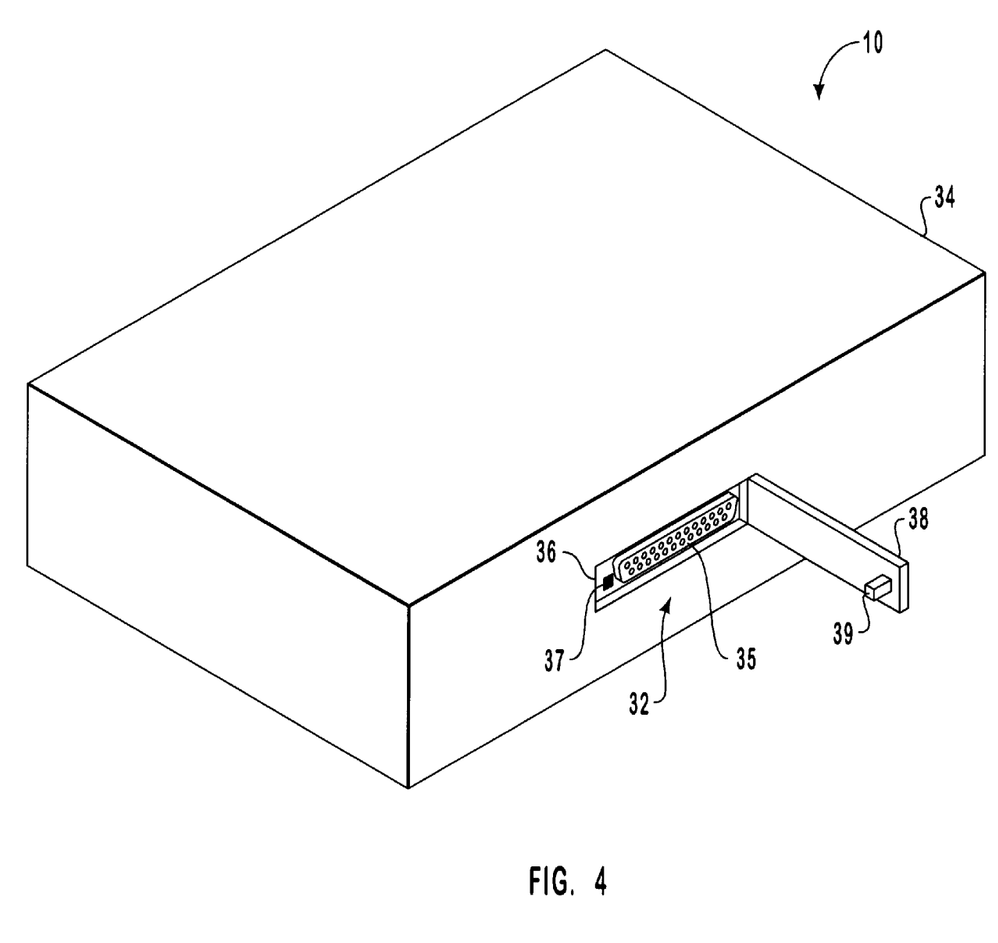
FIG. 4 illustrates an expansion port for connecting a peripheral device to the WebTV box.

FIG. 4 illustrates an expansion port 32 in greater detail. Although FIG. 4 shows only the expansion port 32 of the WebTV box 10, each of the peripheral devices 30 also includes an essentially identical expansion port, as noted above. The expansion port 32 is characterized by an opening 36 in the housing 34 of the WebTV box 10. The opening 36 provides access to a conventional connector 35 which provides a number of pins or sockets for various electrical signals. When the expansion port 32 is not in use, the opening 36 is covered by an access panel 38 that is movably or detachably coupled to the housing. That is, the access panel 38 may open and close on a hinge-type mechanism, for example, or it may be completely removable from the housing 34.

Located next to the connector 35 is a depressable switch 37, the function of which is described in greater detail below. The access panel 38 includes a protrusion 39 which projects toward the inside of the box 10 when the access panel 38 is closed. When the access panel 38 is closed, the protrusion 39 depresses the switch 37. As will be described below, depressing of the switch 37 completes an enable circuit within the WebTV box to enables a power supply within the WebTV box 10. The enable circuit is described in greater detail below. Hence, the power supply within the WebTV box 10 is enabled when the access door 38 is closed. Opening the access panel 38 causes the switch 37 to be released. When the access door is opened, such that the switch 37 is no longer depressed, the power supply will be disabled due to the enable circuit being broken, if no other devices are connected at the port 32. Note, however, that the switch 37 is not caused to be depressed by the connection of another device to the expansion port 32; switch 37 is only depressed when the access door 38 is properly closed. If, however, the access door 38 is open and at least one other device is connected at port 32, the power supply in the WebTV box 10 can still be enabled, but only if all devices in the daisy chain are properly connected and the access door of the most junior device in the daisy chain is closed.

Figure 5:
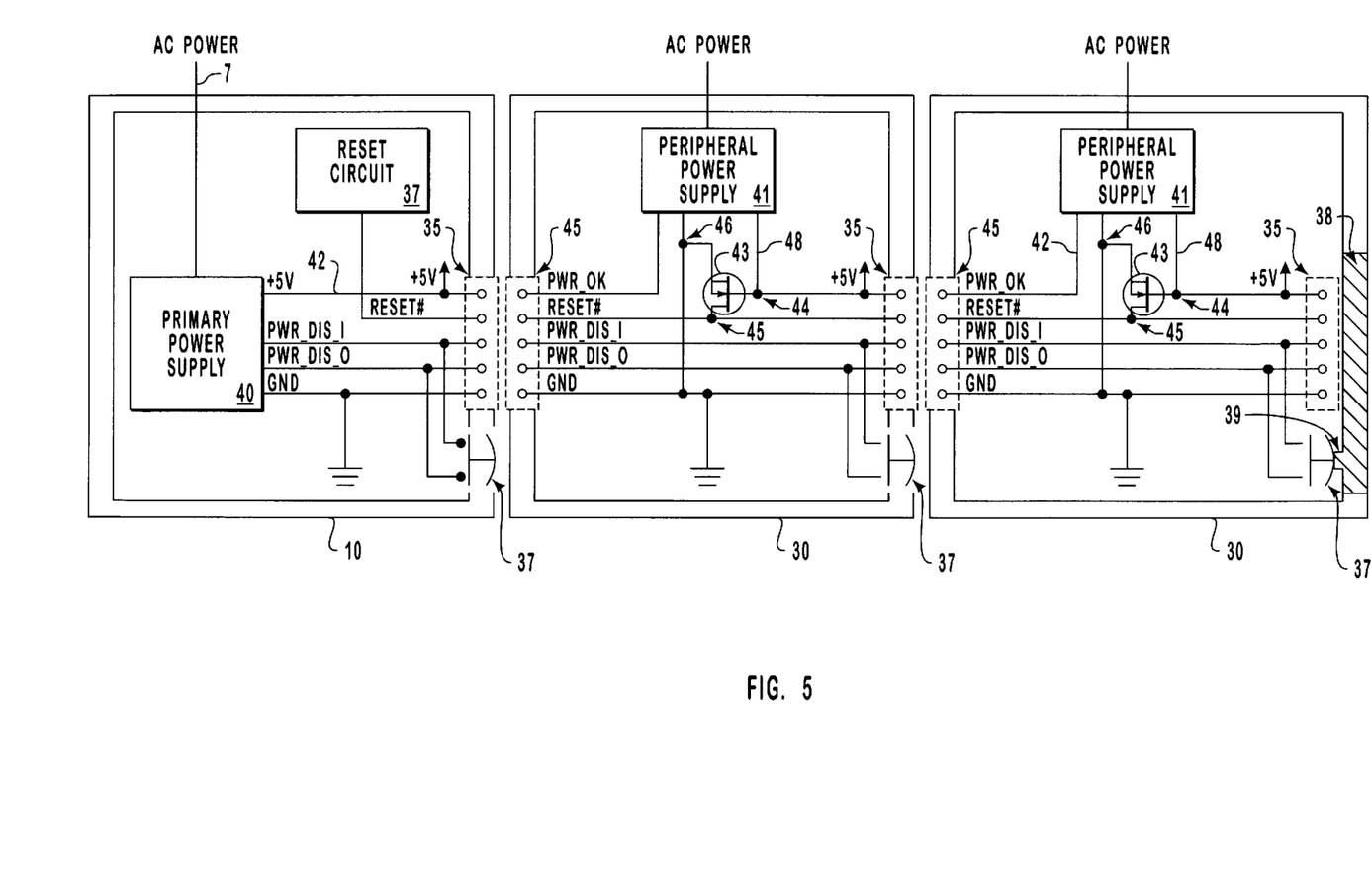
FIG. 5 is a schematic diagram of a WebTV box connected to two peripheral devices in a daisy chain.

FIG. 5 illustrates a schematic diagram which illustrates the enable circuit and the function of the switch 37 in greater detail. Each peripheral device includes an expansion port 32 as described above. In addition, each of the peripheral devices 30 includes a second port, which includes a connector 45 for connecting to the connector 35 of the expansion port 32 of the next more senior device in the daisy chain. The WebTV box 10 includes a primary power supply 40, which receives AC power via power line 7 and which generally supplies power to components in the WebTV box 10. In addition, each of the peripheral devices 30 includes its own, dedicated power supply 41, which receives power from a dedicated AC power line. The primary power supply 40 is grounded via a ground line GND. Also coupled to the primary power supply 40 are lines PWR_DIS_I, PWR_DIS_O, and a 5 volt DC signal 42. Lines PWR_DIS_I and PWR_DIS_O together form a segment of the enable circuit, the completion of which is required to enable the primary power supply 40. In the WebTV box 10 and each of the peripheral devices 30, the switch 37 is coupled between line PWR_DIS_I and line PWR_DIS_O to cause line PWR_DIS_I and line PWR_DIS_O to be shorted together when the switch 37 is depressed (closed). Thus, the enable circuit is thereby completed to enable the power supply 40 when the switch 37 is depressed.

The connector 35 provides terminals for transmitting and receiving all signals of the high-speed expansion bus 28. In addition, the expansion connector 35 includes terminals for the 5 VDC signal 42 and lines $PWR_{13}$ DIS_I, PWR_DIS_O, and GND, to provide these lines to the next more junior device in the daisy chain. Hence, the WebTV box 10 and each of the peripheral devices 30 provides one segment of the enable circuit for enabling and disabling power supply 40. If one or more peripheral devices are connected to the expansion port 32 of WebTV box 10, then the enable circuit is completed to enable the power supply 40 only if all devices in the daisy chain are properly connected in the daisy chain and the access door 38 to the most junior device in the daisy chain is closed. If no peripheral devices are connected to WebTV box 10, then the power supply 40 is enabled only if access door 38 of the WebTV box 10 is closed.

Assume now that a number of peripheral devices 30 are connected to the WebTV box 10 in a daisy chain and that the primary power supply 40 is on. Assume further that the user then wishes to add a peripheral device to the daisy chain. Accordingly, the user opens the access door 38 of the device that is most junior in the daisy chain. When the access door 38 is opened, the switch 37 associated with that device is released, causing an open circuit to occur between lines PWR_DIS_I and PWR_DIS_O and therefore causing the primary power supply 40 in the WebTV box 10 to be disabled (turned off).

The power supply 41 of each peripheral device 30 in the daisy chain receives as input a signal PWR_OK, which in one embodiment is a 5 VDC active-high signal. The power supply 41 of each peripheral device is enabled only when its input PWR_OK signal is asserted. The most senior peripheral device 30 in the daisy chain receives its PWR_OK signal as the 5 VDC signal 42 from primary power supply 40 in the WebTV box 10 (via connectors 35 and 45). Each remaining peripheral device receives its PWR_OK signal as a 5 VDC output 48 from the power supply 41 of the next more senior peripheral device in the daisy chain. Each PWR_OK signal is asserted only when the particular power supply outputting that signal is enabled (on). Thus, the power supply 41 of each peripheral device 30 is enabled or disabled depending upon the state (enabled/disabled) of the power supply of the next more senior device in the daisy chain. If the primary power supply 40 in the WebTV box 10 is enabled, then the signal PWR_OK will be asserted to enable the power 25 supply 41 of the most senior peripheral device 30 in the daisy chain. If the primary power supply 40 has been disabled, then the signal PWR_OK will be deasserted to disable the power supply 41 in the most senior peripheral device 30, which in turn disables the power supplies 41 of each successive peripheral device 30 in the daisy chain. Hence, opening the access door 38 to the most junior device in the daisy chain causes the primary power supply 40 in the WebTV box 10 to be disabled, which causes the power supplies 41 of all peripheral devices 30 in the daisy chain to be disabled.

The WebTV box 10 also includes a Reset circuit 37. The reset circuit receives an active-low signal RESET# from the most senior peripheral device 30 in the daisy chain via expansion port 32. Each of the peripheral devices 30 includes a segment of the RESET# line. When asserted, the RESET# signal causes the Reset circuit 37 to tri-state all signals in the WebTV box 10 and all signals provided through the expansion port. The RESET# line is an open-drain signal on the WebTV box 10; thus, multiple sources can drive this signal low without damaging the Reset circuit 37. The details of the Reset circuit 37 are not necessary for an understanding of the present invention and are therefore not described herein. As will become apparent from the following description, RESET# is asserted whenever the power supply of any of the peripheral devices 30 becomes disabled. Hence, opening the access door 38 of any device in the daisy chain effectively causes all signals to be tri-stated, in addition to disabling all power supplies.

Each of the peripheral devices 30 includes a field effect transistor (FET) 43, which is a p-channel FET (PFET) in one embodiment of the present invention. The source terminal 45 of the PFET 43 is coupled to the RESET# line. The gate 44 of the PFET 43 is coupled to the 5 VDC output 48 of the power supply 41 of the peripheral device 30. The drain of the PFET 43 is coupled to the GND line.

Thus, when the power supply 41 of a peripheral device 30 is disabled, the gate 44 of the PFET 43 is in a low logic state, which turns the PFET on and causes the source 45 of PFET 43 to be shorted to ground. Shorting the source 45 to ground asserts the signal RESET#, causing the Reset circuit 37 to tri-state all signals. On the other hand, if the power supply 41 of a peripheral device 30 is enabled, then the gate 44 of the PFET 43 is held high, causing the PFET 43 to be held in the off state, and therefore causing an open circuit to be maintained between the source 45 and drain 46 of the PFET 43; in that case, the signal RESET# is deasserted. Hence, in order for the entire system (i.e., the WebTV box 10 and all peripheral devices 30 in the daisy chain) to operate, the primary power supply 40 and all peripheral power supplies 41 must be enabled. The entire system is taken out of the reset state only when all power supplied have stabilized.

The present invention therefore allows a user to connect one or more peripheral devices to a processing system without damaging components within any device and without first having to disconnect any device in the processing system from its power source. The present invention provides such functionality without the use of additional buffer circuitry to protect sensitive electronic components.

Thus, an expansion port has been described which provides for system power-down prior to connection of a device to the port. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A first device for use in a processing system having a plurality of devices, at least one of the plurality of devices being a host device that includes a power supply, the first device comprising:

enable circuitry for enabling or disabling the power supply of the host device;

a port coupled to the enable circuitry for connecting the first device to another one of the plurality of devices; and     an access panel mounted to prevent or permit access to the port, wherein the power supply of the host device is enabled if the access panel is configured to prevent access to the port, and wherein the power supply of the host device is disabled if the access panel is configured to permit access to the port and another one of the plurality of devices is not connected at the port.

2. The first device of claim 1, wherein the first device is the host device.

3. The first device of claim 2, wherein the host device comprises a central processing unit and wherein no power is delivered to the central processing unit when the power supply is disabled.

4. The first device of claim 1, wherein the enable circuitry forms one of a plurality of segments of an enable circuit for enabling or disabling the power supply, each of the plurality of devices including one of the segments.

5. The first device of claim 4, wherein the first device is a peripheral device connected to the host device and having a peripheral power supply, the peripheral power supply being enabled if the access panel is configured to prevent access to the port, the peripheral power supply being disabled if the access port is configured to permit access to the port and another one of the plurality of devices is not connected to the port.

6. The first device of claim 1, wherein one or more of the plurality of devices are connected in a daisy chain configuration to the port, the power supply of the host device being enabled if a most junior device in the daisy chain configuration has an associated access panel configured to prevent access to a corresponding port on the most junior device, the power supply of the host device being disabled if the access panel associated with the most junior device is configured to permit access to the corresponding port.

7. The first device of claim 1, wherein the enable circuitry comprises a switch coupled to enable or disable the power supply of the host device, wherein the switch is in a first position when the access panel is configured to prevent access to the port and in a second position when the access panel is configured to permit access to the port, and wherein the power supply of the host device is disabled if the switch is in the second position and another one of the plurality of devices is not connected to the port.

8. A first device configured to be coupled to at least one other device in a processing system, the device comprising:
a power supply;
a housing containing the power supply;
a port for connecting the processing device to another processing device, the port including a switch coupled to enable or disable the power supply; and
an access panel movably coupled to the housing for covering the port when the access panel is closed, such that another processing device is connectable to the port only when the access panel is open, wherein the power supply is enabled if the access panel is closed, and wherein the power supply is disabled, such that the disabled power supply does not deliver power to any portion of the processing system, if the access panel is open and another device is not connected at the port.

9. The device of claim 8, further comprising enable circuitry coupled to the port for enabling or disabling the power supply, wherein the enable circuitry in the first device forms one of a plurality of segments of an enable circuit distributed among a plurality of devices in the processing system for enabling or disabling the power supply.

10. The processing device of claim 9, wherein the plurality of devices are connectable in a daisy chain.

11. The processing device of claim 9, wherein the port permits the segment of the enable circuit in the first device to be connected to a segment of the enable circuit in another one of the plurality of devices.

12. The processing device of claim 8, further comprising a switch mounted at the port and coupled to enable or disable the power supply, wherein the switch is in a first position to enable the power supply when the access panel is closed, wherein the switch is in a second position when the access panel is not closed, and wherein the power supply is disabled if the switch is in the second position and another device is not connected to the port.

13. A first device capable of being coupled to a plurality of other devices in a processing system, at least one of the plurality of other devices including a power supply, the first device comprising:
a first port for connecting the first device to one of the other devices;
a second port for connecting the first device to another one of the other devices; and
an access panel movably mounted to prevent or permit access to the second port, wherein the power supply is enabled if the access panel is configured to prevent access to the second port, and wherein the power supply is disabled if the access panel is configured to permit access to the second port and one of the other devices is not connected at the second port.

14. The first device of claim 13, further comprising enable circuitry coupled to the first port and the second port, the enable circuitry forming a segment of an enable circuit for enabling or disabling the power supply, wherein the enable circuit is distributed among the first device and the plurality of other devices.

15. The first device of claim 14, wherein the first device and the plurality of other devices are connected one with another in a daisy chain.

16. The first device of claim 14, further comprising a switch coupled to the enable circuitry and located at the second port, wherein the switch is in a first position when the access panel is configured to prevent access to the second port and in a second position when the access panel is configured to permit access to the second port, and wherein the power supply is disabled if the switch is in the second position and another device is not connected to the second port.

17. A first processing device configured to be coupled to a second processing device and a third processing device in a daisy chain, the second processing device including a power supply, the first processing device comprising:
enable circuitry for enabling or disabling the power supply, the enable circuitry including a switch;
a first port, coupled to the enable circuitry, for connecting the first processing device to the second processing device;
a second port, coupled to the enable circuitry, for connecting the first processing device to the third processing device;
a housing containing the enable circuitry; and
an access panel movably coupled to the housing for covering the second port when the access panel is closed, such that the third processing device is connectable to the second port only if the access panel is open, wherein the switch is in a first position to enable the power supply when the access panel is closed, wherein the switch is in a second position when the access panel is open, and wherein the power supply is disabled if the switch is in the second position and the third device is not connected to the port.

18. The first processing device of claim 17, wherein the enable circuitry forms one of a plurality of segments of an enable circuit for enabling or disabling the power supply, wherein the enable circuit is distributed among the first processing system, the second processing system, and the third processing system.

19. In a first device connected in a processing system having a plurality of devices, a method of protecting against damage due to electrical transients, at least one of the plurality of devices being a host device having a power supply, the first device including a port for connecting the first device to another device in the processing system, the first device further having an access device configurable to permit or prevent connection to the port, the method comprising the steps of:

monitoring the processing system to detect occurrence of a condition, the condition occurring when the access device is configured to permit access to the port and a device is not connected to the port;

maintaining a first state while an occurrence of the condition is not detected, the power supply being enabled while the first state is maintained; and entering a second state when an occurrence of the condition is detected, the power supply being disabled when the second state is entered.

20. The method of claim 19, wherein the plurality of devices are connected in a daisy chain, wherein the power supply is disabled if any one of the plurality of devices is in the second state.

21. The method of claim 20, wherein the power supply is enabled if each of the plurality of devices is in the first state.

22. In a system including one or more peripheral devices and a host device having a power supply, wherein the host device includes a port capable of establishing electrical connection between the host device and the one or more peripheral devices and an access device positioned to selectively permit access to the port, a method for coupling the one or more peripheral devices to the host device, comprising the steps of:

with the power supply being initially enabled and in response to the access device being displaced by a user of the processing system so as to permit access to the port, disabling the power supply; and in response to the peripheral device being coupled to the port, enabling the power supply.

23. A method as defined in claim 22, wherein the step of disabling the power supply is conducted without any user action other than displacement of the access device.

24. A method as defined in claim 22, wherein the step of enabling the power supply is conducted without any user action other than coupling the peripheral device to the port.

25. A method as defined in claim 22, wherein the host device includes a central processing unit, the step of disabling the power supply comprising the step of discontinuing delivery of power to the central processing unit.

26. In a processing system including a host device having a primary power supply and one or more peripheral devices each having a peripheral power supply, wherein the host device and the one or more peripheral devices each has a port and a corresponding access device that selectively permits access to the port and wherein the one or more peripheral devices can be connected to the host device in a daisy chain configuration using the ports, a method for selectively enabling the primary power supply and the peripheral power supply, comprising the steps of:

in response to sensing that one or more peripheral devices are connected to the host device in a daisy chain configuration and that the access device of a most junior peripheral device in the daisy chain configuration is positioned to prevent access to the corresponding port, enabling the peripheral power supply of each of the one or more peripheral devices and the primary power supply; and in response to sensing that the access device of the most junior peripheral device is positioned to permit access to the corresponding port, disabling the peripheral power supply of each of the one or more peripheral devices and the primary power supply.

27. A method as defined in claim 26, further comprising the step of disabling the primary power supply in response to sensing that at least one of the one or more peripheral devices is no longer connected to the host device in the daisy-chain configuration.

28. A method as defined in claim 26, further comprising the step of connecting, by a user of the system, the one or more peripheral devices to the host device, including the steps of:

with the primary power supply being initially enabled, displacing, by the user, the access device of the host device to permit access to the port of the host device;

sensing that the access device of the host device has been displaced; and disabling the primary power supply.

29. A method as defined in claim 28, wherein the step of connecting the one or more peripheral devices to the host device further comprises the step of connecting, by the user, the one or more peripheral devices to the port of the host device, with the access device of the most junior peripheral device being positioned to prevent access to the corresponding port of the most junior peripheral device.

* * * * *

UNITED STATES PATENT AND TRADEMARK OFFICE
CERTIFICATE OF CORRECTION

PATENT NO. : 5,931,949
DATED : May 16, 1997
INVENTOR(S) : Stephen G. Perlman, Tim Bucher It is certified that error appears in the above-identified patent and that said Letters Patent is hereby corrected as shown below:

Col. 2, ln. 39: after "server" delete [5]

Col. 4, ln. 26: after "box to" change "enables" to --enable--

Col. 5, ln. 4: after "lines PWR" change "13" to --_--

Col. 5, ln. 47: after "power" and before "supply" delete [25]

Col. 5, ln. 58: after "circuit" change "37" to --47--

Col. 5, ln. 63: after "circuit" change "37" to --47--

Col. 6, ln. 1: before "The details" change "37" to --47--

Col. 6, ln. 1: after "circuit" change "37" to --47--

Col. 6, ln. 20: after "circuit" change "37" to --47--

Figure 5: Box labeled "Reset Circuit", "37" should be changed to --47--

Signed and Sealed this

Third Day of October, 2000

Attest:

Q. TODD DICKINSON

*Attesting Officer*     *Director of Patents and Trademarks*